(12) United States Patent
Najmi (10) Patent No.: US 7,007,088 B1
(45) Date of Patent: Feb. 28, 2006

(54) METHOD AND APPARATUS FOR PROVIDING AN E-BUSINESS AUDIT TRAIL IN A DISTRIBUTED COMPUTING SYSTEM

(75) Inventor: Farrukh S. Najmi, Reading, MA (US)

(73) Assignee: Sun Microsystems, Inc., Santa Clara, CA (US)

( * ) Notice: Subject to any disclaimer, the term of this patent is extended or adjusted under 35 U.S.C. 154(b) by 631 days.

(21) Appl. No.: 09/703,919

(22) Filed: Oct. 30, 2000

Related U.S. Application Data (60) Provisional application No. 60/208,686, filed on May 31, 2000.

(51) Int. Cl.
*G06F 13/00* (2006.01)

(52) U.S. Cl. ............... 709/225; 709/224; 719/318; 705/1

(58) Field of Classification Search ............... 709/226, 709/223, 224, 225; 705/67, 26, 80, 1; 395/700, 395/680–685; 719/318; 370/398
See application file for complete search history.

(56) References Cited

U.S. PATENT DOCUMENTS

| 5,966,531 | A | * | 10/1999 | Skeen et al. ............... 719/315 |
|---|---|---|---|---|
| 6,105,012 | A | * | 8/2000 | Chang et al. ............... 705/64 |
| 6,115,641 | A | * | 9/2000 | Brown et al. ............... 700/102 |
| 2001/0027446 | A1 | * | 10/2001 | Metcalfe ............... 705/67 |
| 2002/0002501 | A1 | * | 1/2002 | Reyda et al. ............... 705/26 |
| 2002/0040352 | A1 | * | 4/2002 | McCormick ............... 705/80 |
| 2002/0116205 | A1 | * | 8/2002 | Ankireddipally et al. ...... 705/1 |
| 2002/0129004 | A1 | * | 9/2002 | Bassett et al. ............... 707/1 |
| 2002/0174227 | A1 | * | 11/2002 | Hartsell et al. ............. 709/226 |
| 2003/0081618 | A1 | * | 5/2003 | Deng ............... 370/398 |

OTHER PUBLICATIONS

Newton's Telecom Dictionary, Harry Newton, CMP Books, 19th Edition.*

* cited by examiner

*Primary Examiner*—Viet D. Vu
(74) *Attorney, Agent, or Firm*—Beyer Weaver & Thomas, LLP (57) ABSTRACT

A system, apparatus, and a method of memorializing an e-business audit trail are described. As a method, if a message is to be sent to a subscriber by a message service and if an administrator is running, the message is stored in a corresponding topic in the administrator. If, however, the administrator is not running, the message is stored by the message service. When response is received, if the administrator is running, the response is stored the topic in the administrator corresponding to the sent message, whereas if the administrator is not running, the response is stored by the message service. An audit trail is memorialized by retrieving the stored sent message and the corresponding response.

17 Claims, 12 Drawing Sheets

METHOD AND APPARATUS FOR PROVIDING AN E-BUSINESS AUDIT TRAIL IN A DISTRIBUTED COMPUTING SYSTEM

CROSS REFERENCE TO RELATED APPLICATIONS

This application takes priority from (i) U.S. Provisional Patent Application No. 60/208,686 filed on May 31, 2000 which is incorporated by reference in its entirety. This application is also related to (ii) U.S. Pat. No. 6,687,848 filed concurrently herewith naming Farrukh S. Najmi as inventor and assigned to the assignee of the present application, (iii) U.S. patent application Ser. No. 09/704,081 filed concurrently herewith naming Farrukh S. Najmi as inventor and assigned to the assignee of the present application, (iv) U.S. Pat. No. 6,753,889 filed concurrently herewith naming Farrukh S. Najmi as inventor and assigned to the assignee of the present application, and (v) U.S. patent application Ser. No. 09/704,110, filed concurrently herewith naming Farrukh S. Najmi as inventor and assigned to the assignee of the present application, each of which are also incorporated herein by reference in their entireties for all purposes.

BACKGROUND OF THE INVENTION

1. Field of Invention

The invention relates generally to computer systems. More particularly, methods and apparatus for providing a reliable transaction audit trail in an enterprise computer system.

2. Description of Relevant Art

In modern enterprise computing environments, a number of personal computers, workstations, mainframes, and the like along with other devices such as large mass storage subsystems, network interfaces, as well as interfaces to the public telephony systems are interconnected providing an integrated environment in which information may be shared among the various users. Typically, users may be performing a variety of operations, including order receipt, manufacturing, shipping, billing, inventory control, and other operations in which sharing of data on a real time basis provides a significant advantage over, for example, maintaining separate records and attempting to reconcile them later.

With the advent of large-scale business to business (B2B) e-commerce, it has become of paramount importance for those companies (i.e., e-businesses) involved in e-commerce to be able to reliably conduct automated electronic transactions with multiple partners. Unfortunately, however, due to the lack of a unifying standard, there are no consistent rules that govern these B2B transactions. As a result, an e-business must be able to successfully accommodate multiple partners, each of which can have, for example, a different message transport protocol, a different way of representing the content of B2B messages, and a different way to represent the address information that envelopes the B2B message content (i.e., the B2B message envelope) in order to successfully conduct an e-business transaction. In addition, since each e-business partner is an independent entity, each partner can follow independent schedules and policies such as when their respective systems are available. Therefore, the e-business can find it nearly impossible to reconcile the almost limitless number of possible combinations for all potential e-business partners.

One approach to solving the problems of cross platform communication is to use component based, multi-tier applications based on, for example, Java 2 Enterprise Edition (J2EE) technology from Sun Microsystems Inc. of Mountain View, Calif. J2EE technology, in the form of a J2EE server, represents a multi-tier design that simplifies developing, deploying, and maintaining enterprise applications. It enables developers to focus on the specifics of programming their business logic, relying on the J2EE server to provide system services, and client-side applications (both stand alone and within web browsers) to provide the user interaction. Once developed, business logic can be deployed on servers appropriate to existing needs of an organization.

Although J2EE server technology substantially solves many of the problems related to cross platform performance, there still remains the need to provide a mechanism whereby an e-business and its respective e-business partners can reliably conduct an e-business transaction.

In addition to being able to reliably conducting an e-business transaction, it is also very important for companies conducting e-business transactions with multiple partners to be assured a capability of memorializing transactions in a transaction audit. For example, it is important for an administrator, for example, in a particular e-business to be able to look at an audit trail that memorializes a history of all B2B transaction traffic between the particular e-business and its various partners.

Therefore, in view of the foregoing, it would be advantageous and therefore desirable to have a scalable, cross platform enterprise computer system having an administration tool capable of reliably memorializing an audit trail for all B2B transactions between an e-business and all its partners.

SUMMARY OF THE INVENTION

Broadly speaking, the invention relates to an improved method, apparatus and computer system for memorializing a business to business audit trail in a multi-platform environment. The invention can be implemented in numerous ways, including as a method, a computer system, and an apparatus. Several embodiments of the invention are discussed below.

In one embodiment, a method of memorializing an e-business audit trail is disclosed. If a message is to be sent to a subscriber by a message service and if an administrator is running, the message is stored in a corresponding topic in the administrator. If, however, the administrator is not running, the message is stored by the message service. When response is received, if the administrator is running, the response is stored the topic in the administrator corresponding to the sent message, whereas if the administrator is not running, the response is stored by the message service. An audit trail is memorialized by retrieving the stored sent message and the corresponding response.

BRIEF DESCRIPTION OF THE DRAWINGS

The invention, together with further advantages thereof, may best be understood by reference to the following description taken in conjunction with the accompanying drawings in which.

DETAILED DESCRIPTION OF THE EMBODIMENTS

In general, a business to business (B2B) messenger arranged to provide a reliable communication link between an e-business entity in the form of an enterprise computer system and an associated partner and/or any other associated enterprise computer system is described. In one embodiment, the enterprise computer system is a J2EE based enterprise computer system. The B2B messenger is coupled to a Java Message Service API (referred to as JMS) that provides an interface between the B2B messenger and the various business components included in the J2EE based enterprise computer system. In the described embodiment, the B2B messenger subscribes to a Java Messenger Server (JMS) topic based upon an associated subscription rule. By subscribes, it is meant that the B2B messenger "listens" to a particular JMS topic that is identified with a particular subscription rule. When the JMS topic points to a particular native message (referred to as a JMS message), a subscription manager included in the messenger receives the JMS message and directs a message adapter to modify the JMS message into a format consistent with a receiving partner based upon both the corresponding subscription rule and a corresponding document template, or B2B schema. In a preferred embodiment, the B2B schema is used as a template to assure that the document sent to the receiving partner conforms to the partner's documentation rules.

Once the JMS message has been converted, it is forwarded to the receiving partner by way of a sender partner adapter that defines, in part, a transport protocol specific to the receiver partner.

Once received, the receiver partner returns a response message by way of a receiver partner adapter, which typically takes the form of a servlet. As directed by a delivery manager using both a delivery rule and the B2B schema, a receiver message adapter converts the response to a received JMS message, which is then delivered to a corresponding JMS topic in the JMS. In this way, the e-business is able to communicate in a loosely coupled manner with the associated partner without the requirement of knowing what form the partner's portion of the B2B contract takes, and vice versa. By loosely coupling the two portions of the B2B contract, the inventive messenger provides for B2B integration between J2EE based businesses and its partners, that may or may not be J2EE based.

In a particular embodiment, a business transaction audit trail of all B2B transactions is provided by an administrator coupled to the JMS. For each JMS topic that is being used to send or receive B2B messages to or from an external partner system, the JMS will send a copy of the B2B message to the administrator, whether or not the administrator is running. In those cases where the administrator is running, the B2B messages are stored in the administrator whereas if the administrator is not running, the JMS will store the B2B message. When the administrator is started, all B2B messages sent or received during the period of time that the administrator was not running are sent to the administrator by the JMS. A message monitor coupled to the administrator can then be used to display any of the B2B messages as desired.

The inventive messenger is thereby able to overcome the problems related to the current lack of standards (such as API and transport protocols, schemas, etc.), requirement for reliable B2B coupling, and the need for asynchronous communications when a particular partner is not responding or has non-congruous operating hours. In addition, the messenger is able to provide a reliable audit trail for all B2B transactions that have been either sent to or received from the messenger.

Although, the invention will initially be described in terms of an e-business messenger as part of a J2EE based enterprise computer system, the present invention can be used in any networked computer system that uses JMS as its messaging infrastructure.

Figure 1:
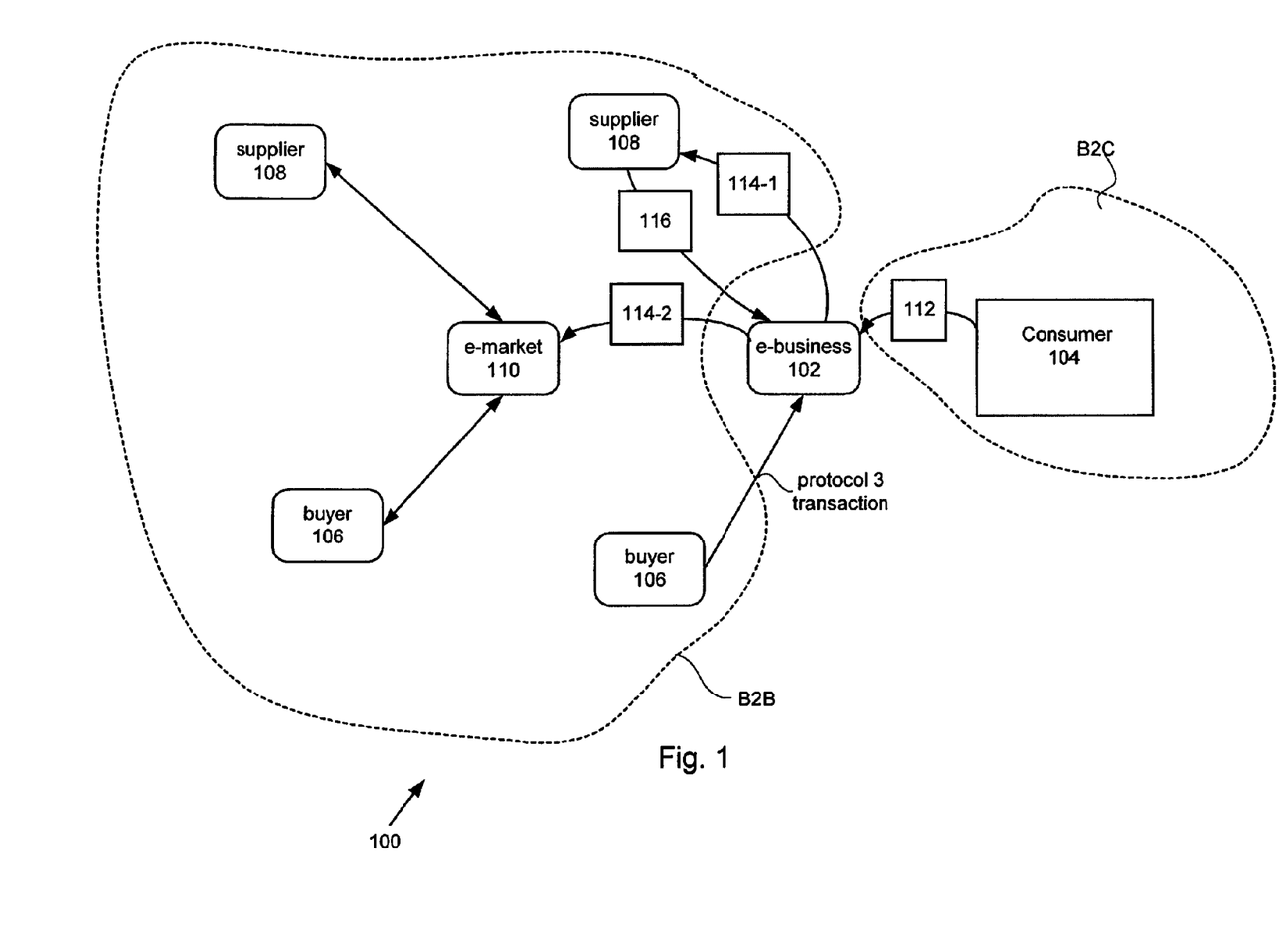
FIG. 1 shows an enterprise computer system in accordance with an embodiment of the invention.

With reference to FIG. 1, a Business to Business to Customer (B2B2C) system 100 in accordance with an embodiment of the invention is shown. The system 100 includes an inventive Java 2 Enterprise Edition (J2EE™) based enterprise computer system type e-business 102 capable of reliably (and asynchronously) communicating with any number of associated partners regardless of their respective transport protocols, document schemas, etc. In the described embodiment, the e-business 102 is coupled to an e-customer 104 (to form the B2C portion of the system 100) and a variety of independent buyers 106, suppliers 108, as well as an e-market 110, each of which can, and usually does, have its own standards and practices for conducting a business transaction. It should be noted that the e-market 110 and any of the partner systems can be in any technology other than the J2EE.

In order to reliably conduct a customer to business transaction, such as for example, when the e-customer 104 wishes to purchase an item, or items, such as a personal or business computer system, the e-customer 104 will generate a purchase order 112, also referred to as a PO 112, indicating the particular computer system desired. In some cases, the PO 112 can include a variety of desired components, or it can present a single item order for which the e-business 102 parses into its various constituent components. For example, if the e-customer 104 has indicated that a personal computer system is desired, the PO 112 can include a single order number that upon further inspection can be broken down into constituent components, such as chip sets, mother boards, processors, etc.

Once the e-business 102 has received the PO 112, a determination is made whether or not there is sufficient component inventories, on hand or otherwise available, to fill the PO 112. Based upon this determination, the e-business 102 will generate any number of component purchase orders PO 114-1 through PO 114-2, each of which is to be sent to a corresponding partner or partners for filling. For example, if the purchased computer system requires a number of chip sets, the e-business 102 will check available chip set inventory and based upon those inventory levels, will send the PO 114-1 to a chip set supplier 108 for the purchase of chip sets. It should be noted that the PO 114-1 is in a document format consistent with what the chip set supplier 108 expects to receive in spite of the fact that the e-business 102 has no knowledge of that document form. Once the PO 114-1 is received, the chip set supplier 108 will then send a response 116 back to the e-business 102 in the form of an acknowledgement 116. Again the acknowledgement 116 will be sent in a form consistent with the chip set suppliers, documentation schema but will be processed by the e-business 102 in its own format, or schema. Therefore, it is one of the advantages of the invention that even though the acknowledgement 116 is sent in a form that is native to the supplier 108, the e-business 102 processes the acknowledgment 116 in a form native to its operational system.

In some cases, the acknowledgement 116 is missing information that is nonetheless automatically filled in such that the e-business 102 is capable of relying on the information received. However, in those cases where the supplier 108 is not responding or whose hours of operation are different from the e-business 102, the PO 114-1 is retransmitted until the acknowledgement 116 is received at the e-business 102. In this way, the communication between the e-business 102 and the supplier 108 can be asynchronous in nature thereby facilitating communication when the parties operating under different schedules, business hours, etc. One such an example is when one partner is located many time zones from another partner in which case it may be the middle of the day for one and the middle of the night for the other. By providing this asynchronous capability, the reliability of the system 100 is substantially enhanced.

In one implementation of the invention, the e-business 102 is capable of maintaining a reliable audit trail of all B2B transactions carried out between the e-business 102 and any of its partners. In the instant example, the administrator would maintain a record of the receipt of the purchase order 112, the purchase orders 114-1 and 114-2, as well as the acknowledgment 116. In some cases, these records can be stored for a period of time selected by the e-business 102.

Figure 2:
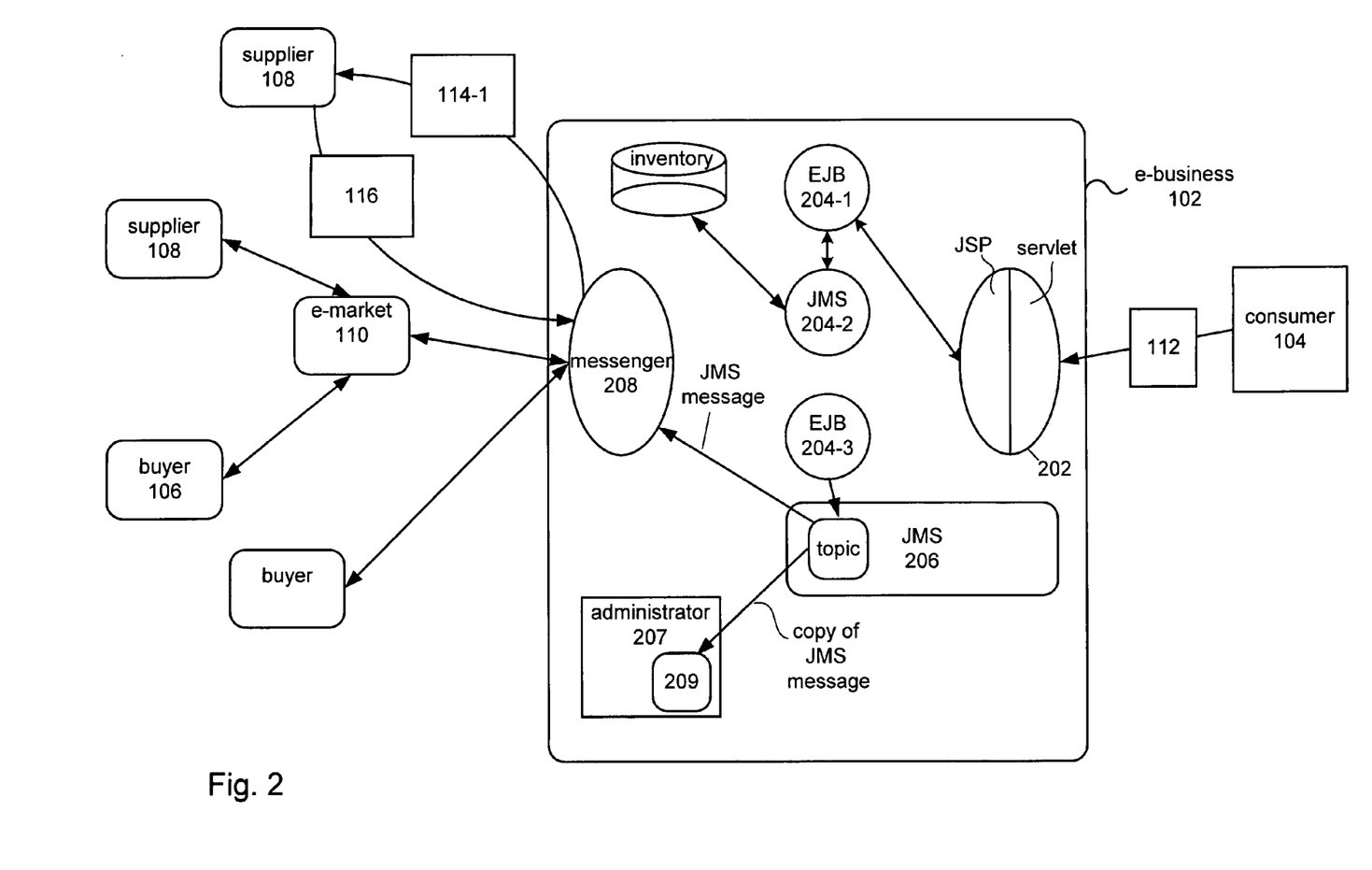
FIG. 2A illustrates a J2EE based implementation of the enterprise computer based e-business in accordance with an embodiment of the invention.
FIG. 2B illustrates an exemplary B2B transaction audit trail in accordance with an embodiment of the invention.

FIG. 2 illustrates an EJB based implementation of the e-business 102 in accordance with an embodiment of the invention. This particular implementation of the e-business 102 includes a client API 202 that includes a servlet and a Java Server Page (JSP). It is well known in the art that a servlet is a Java program that extends the functionality of a Web server by generating dynamic content and interacting with Web clients using a request-response paradigm. A Java Server Page on the other hand is an extensible Web technology that uses template data, custom elements, scripting languages, and server-side Java objects to return dynamic content to a client. Typically the template data is HTML or XML elements, and in many cases the client is a Web browser.

The client API 202 is, in turn, coupled to any number Enterprise Java Beans (EJB™) 204-1 through 204-3. Developed by Sun Microsystems, Inc. of Mountain View, Calif., the EJB is a component architecture for the development and deployment of object-oriented, distributed, enterprise-level applications. For example, the EJB 204-1 can be configured as an order processing EJB suitable for processing the PO 112 into its constituent order components, such as the number of chip sets required, the number of mother boards, etc. Once the EJB 204-1 has processed the PO 112, the information is passed to, for example, the EJB 204-2 for inventory reconciliation. If the EJB 204-2 determines that additional chip sets are required, then a command requesting additional chipsets (in the form of a PO, for example) is sent to an appropriate Topic in the Java Message Service (JMS) API 206. The Topic in JMS 206 is, in turn, subscribed to by a B2B messenger 208 that listens to the Topic and based upon a particular subscription rule will receive a particular document, or JMS message, that has been posted to the Topic in JMS 206.

In the described embodiment, an administrator 207 capable of maintaining an audit trail of all the transactions carried out by the JMS 206 is included in or coupled to the JMS 206. The administrator 207 creates what is referred to as a durable topic subscriber 209 for each JMS topic that is being used to send or receive B2B messages to or from external partner systems. The JMS 206 sends a copy of any B2B message to the administrator 207 whenever the administrator 207 is running. In those cases where the administrator 207 is not running, the JMS 206 stores those B2B messages either send to or received by the JMS 206 during the period of time that the administrator 207 was not running. When the administrator 207 is subsequently started, the JMS 206 sends all B2B messages missed by the administrator 207 during the period of time that it was not running to the administrator 207. In this way, a complete audit trail of all B2B messages (an example of which is shown in FIG. 2B) can be maintained in a reliable manner for any period of time desired.

Once a message is received from the JMS Topic, the B2B messenger 208 generates and sends the PO 114-1 to the supplier 108 in a format consistent with what is expected by the supplier 108. In this way, the B2B messenger 208 enables the e-business 102 to communicate with the supplier 108 in a loosely coupled manner in that neither the e-business 102 nor the supplier 108 are aware, or even care about, the schemas, protocols, business policies, etc. of each other.

In those cases where, for whatever reason, the supplier 108 has not received the PO 114-1, the B2B messenger 208 will recognize this fact and continue to attempt to send the PO 114-1 until such time as a response, in the form of the acknowledgement 116 is received. Once the acknowledgement 116 has been received by the B2B messenger 208, the B2B messenger 208 reformats the acknowledgement 116 consistent with what is expected by the e-business 102. The acknowledgement is then posted to the JMS 206 indicating to the appropriate EJB that the PO 114-1 has been acknowledged as being received by the supplier 108.

Figure 3:
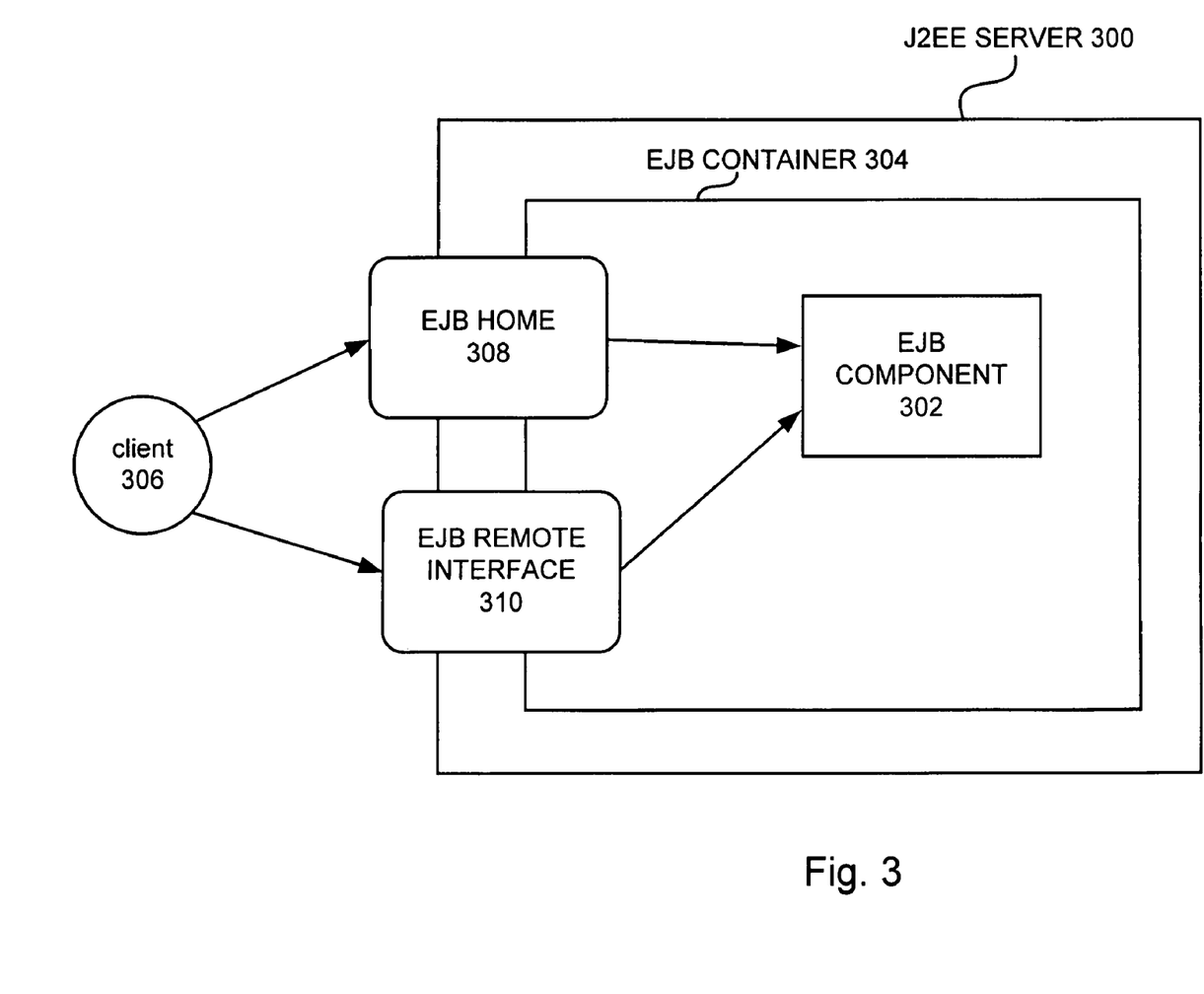
FIG. 3 shows an Enterprise Java Bean (EJB) server in accordance with an embodiment of the invention.

With reference to FIG. 3 it is well established that one of the basic building blocks of any J2EE based enterprise computer system is what is referred to as a J2EE server. FIG. 3 illustrates the architecture of a J2EE server 300 in accordance with an embodiment of the invention. In the described embodiment, the J2EE server 300 is a collection of services for supporting an EJB installation. These services include management of distributed transactions, management of distributed objects and distributed invocations on these objects, and low-level system services. In short, the J2EE server 300 manages the resources needed to support an EJB component (or Bean) 302 that is included in an EJB container 304. In the described embodiment, the EJB container 304 is a home for EJB components such as EJB component 302 providing a scalable, secure, transactional environment in which EJB components can operate. The EJB container 304 handles the object life cycle, including creating and destroying an object as well as handling the state management of EJB components.

Since the EJB container 304 is transparent to a client, such as the JMS 206, there is no client API to it. When an EJB component is installed in the EJB container 304, the EJB container 304 provides two implementations: an implementation of the EJB component's EJB Home interface 308, discussed below, and the EJB component's remote interface.

When a Bean 302 is installed on the J2EE server 300, a remote interface referred to as an EJB Object 310 is automatically generated. The EJB Object 310 is an object that exposes only the remote interface specified by the programmer. In this way, the EJB Object 310 acts like a proxy, intercepting any remote object invocations and calling the appropriate methods on the enterprise Bean instance. The EJB container 304 implements the EJB Home interface 308 of each Bean 302 installed in the container. It allows for the creation of a Bean, deletion of a Bean and querying information or "metadata" about a Bean.

Figure 4:
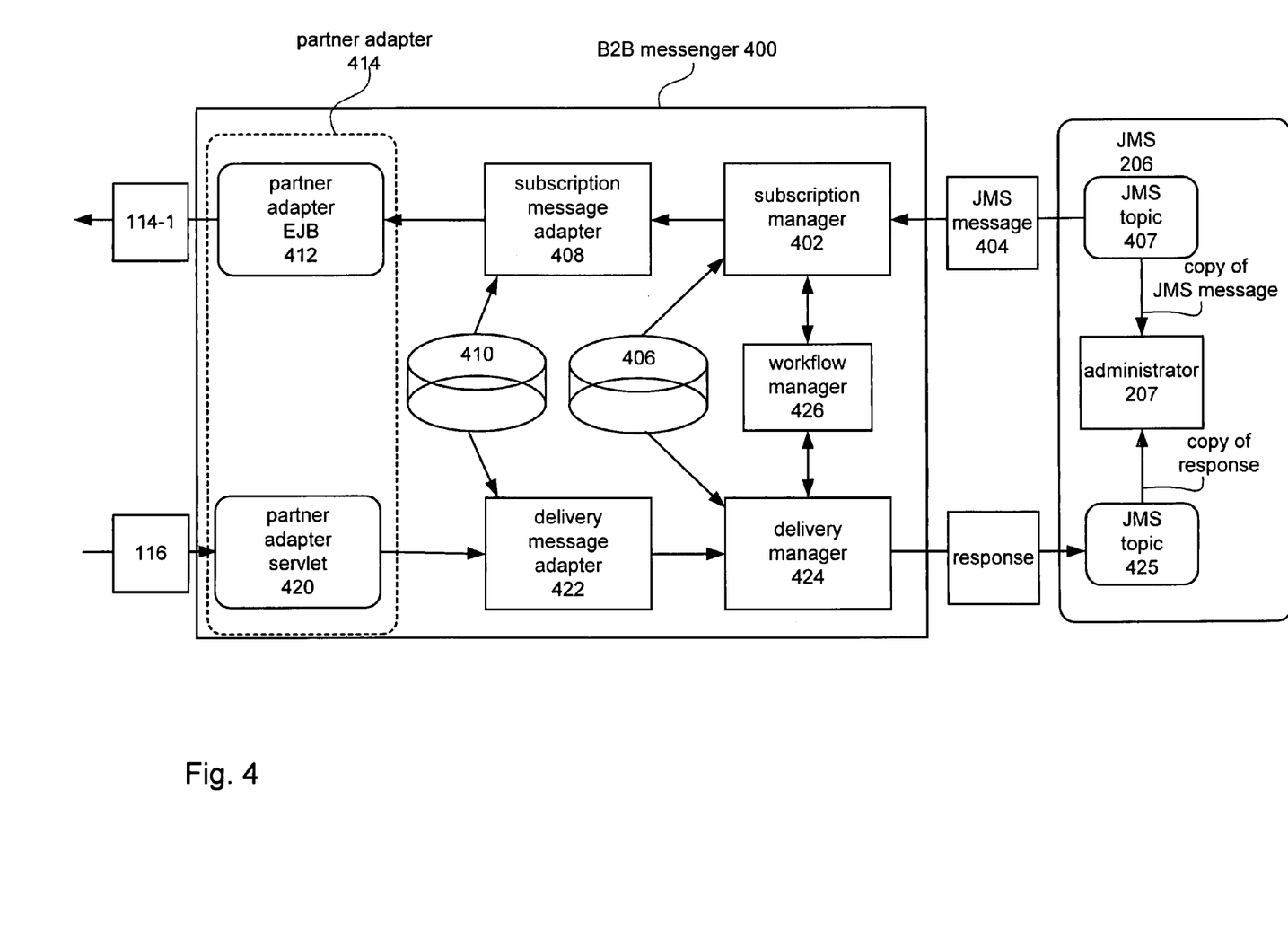
FIG. 4 shows a particular implementation of a B2B messenger is shown in accordance with an embodiment of the invention.

With reference to FIG. 4, a B2B messenger 400 is shown in accordance with an embodiment of the invention. It should be noted that the B2B messenger 400 is but one possible implementation of the B2B messenger 208 shown in FIG. 2 and as such should not be construed as limiting the intent or scope of the invention. Therefore, the B2B messenger 400 includes a subscription manager 402 arranged to receive a JMS message 404 based upon a subscription rule retrieved from a B2B contract database 406. In the described embodiment, the copy of the JMS message 404 is sent to an administrator 207 in order to provide an audit trail of the particular e-business transaction. In those cases where the administrator 207 is not running, the copy of the JMS message is stored by the JMS 206 until such time as the administrator 207 is running.

In the described embodiment, the B2B contract database 406 includes, in part, those subscription rules deemed most appropriate to the e-business 102. The subscription rule provides a B2B contract between a sending party and a receiving party in that it identifies a particular type of document (such as a purchase order), a particular format of the document associated with a particular partner (or partners), a particular transport protocol used to transport the document from one partner to another, and a particular partner adapter used to communicate with the partner system. In this way, the subscription rule provides a guide that the subscription manager 402 uses to "listen" for those JMS topics that correspond to a particular subscription rule. In this way, the subscription manager 402 receives only those JMS messages from those JMS topics to which it has subscribed based upon those subscription rules retrieved from the B2B contract database 406. For example, if the JMS 206 posts a purchase order, it will do so in the JMS topic 407 associated with purchase orders and pointed to by a purchase order subscription rule.

Once the JMS message 404 has been received by the subscription manager 402, the subscription manager 402 directs an appropriate message adapter 408 (specified in B2B contract for specific type of message) coupled thereto to reformat the received JMS message 404 to a form expected by a partner system, which in this example, is the supplier 108. This reformatting is typically based upon a document template, or schema, stored in a B2B schema database 410. Once appropriately formatted, the PO 114-1 is forwarded to a sending portion 412 of a partner adapter unit 414. In a preferred embodiment, the sending portion 412 takes the form of a partner adapter EJB 412 that, again, based upon the appropriate subscription rule uses a transport protocol appropriate to the supplier 108. Although not shown in FIG. 4 (but, however, shown in FIG. 5), a transport adapter unit can be incorporated into the partner adapter providing appropriate transport protocol information for every partner system.

When the supplier 108 receives the PO 114-1, the supplier 108 responds by sending the acknowledgement 1116 to a receiving portion 420 of the partner adapter 414. In the described embodiment, the receiving portion 420 is a partner adapter servlet 420 capable of receiving the acknowledgement 1116 in the form of, for example, XML. Based upon a delivery rule retrieved from the B2B contract database 406, the partner adapter servlet 420 directs an appropriate delivery message adapter 422 to reformat the acknowledgement 116 into a form consistent with what is expected by the e-business 102. More particularly, delivery message adapter 422 is capable of converting an XML based document into a Java based document, or in some cases, to another XML document. Once appropriately converted, a delivery manager 424 posts the acknowledgement 116 to a JMS topic 425 in addition to the administrator 207 when running. In those cases where the administrator 207 is not running, the response is stored at the JMS 206 until such time as the administrator 207 is running.

In a preferred embodiment, the B2B messenger 400 also includes a workflow manager 426 coupled to both the subscription manager 402 and the delivery manager 424 arranged to improve system reliability by, in part, assuring that lost information (i.e., "lossy" type messages) is recaptured. Typically, the workflow manager 426 reviews all outgoing messages that pass through the subscription manager 402 of the B2B messenger 400 and stores those documents, or portions thereof, that are deemed to be important based on a particular subscription rule. The workflow manager 426 then uses this stored information to "fill in" any information that is deemed to be "missing" from the response document.

Using the example of the PO 114-1 and the acknowledgment 116, the workflow manager 426 will review the PO 114-1 as it passes through the subscription manager 402 and record those portions of the purchase order 114-1 (such as sendee, part number, quantity, price, etc.) that are deemed most important to the particular business transaction (which in this case is a purchase contract) being conducted. During the response portion of the communication, when the workflow manager 426 is notified that the acknowledgement 116 is ready to be delivered by the delivery manager 424, the workflow manager 426 reviews the acknowledgement 116 and "fills" in any missing information.

Figure 5:
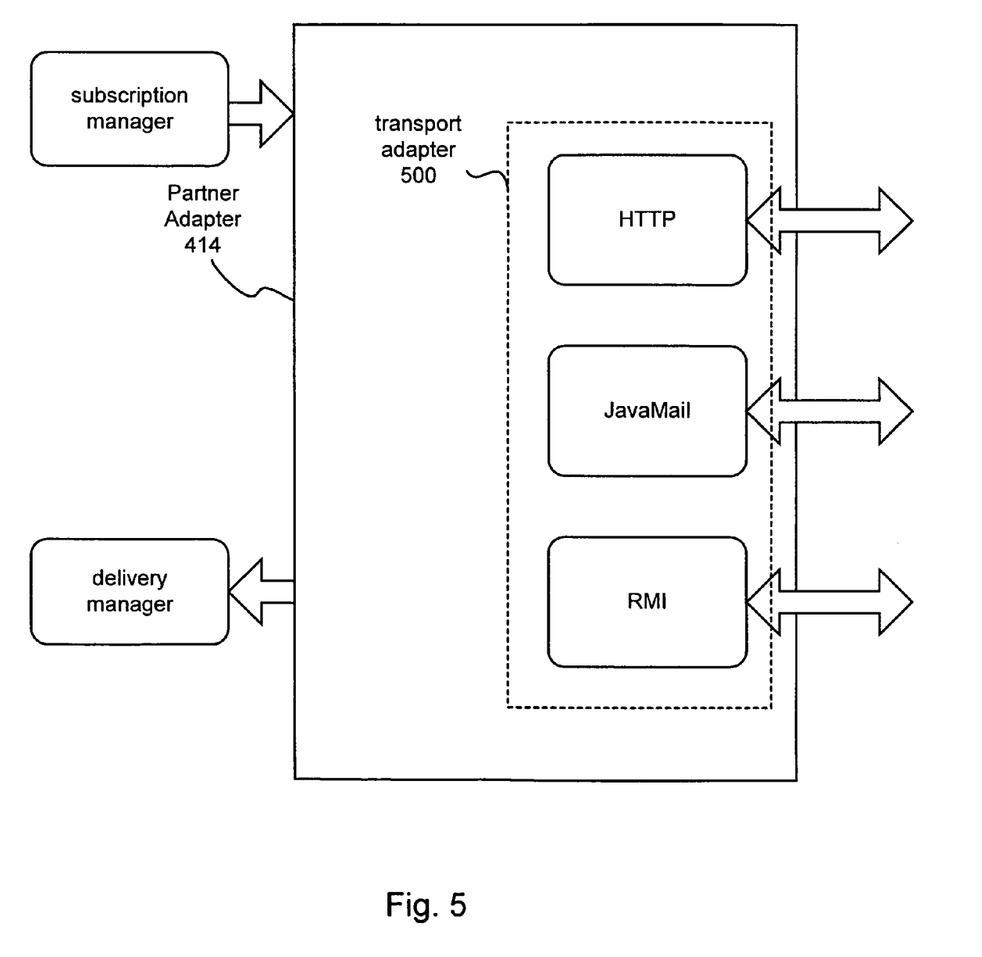
FIG. 5 illustrates a transport adapter as part of the partner adapter described with reference to FIG. 4.

FIG. 5 illustrates a transport adapter 500 as part of the partner adapter described with reference to FIG. 4. The transport adapter 500 allows the B2B messenger 208 to talk to a partner system using any specified transport protocol. For example, the transport adapter 500 is capable of providing any number of transport protocols such as, for example, HTTP/S, SMTP, IIOP. In a preferred embodiment, the transport adapter 500 can be constructed for any partner system using a toolkit or other such implementation tool.

Figure 6:
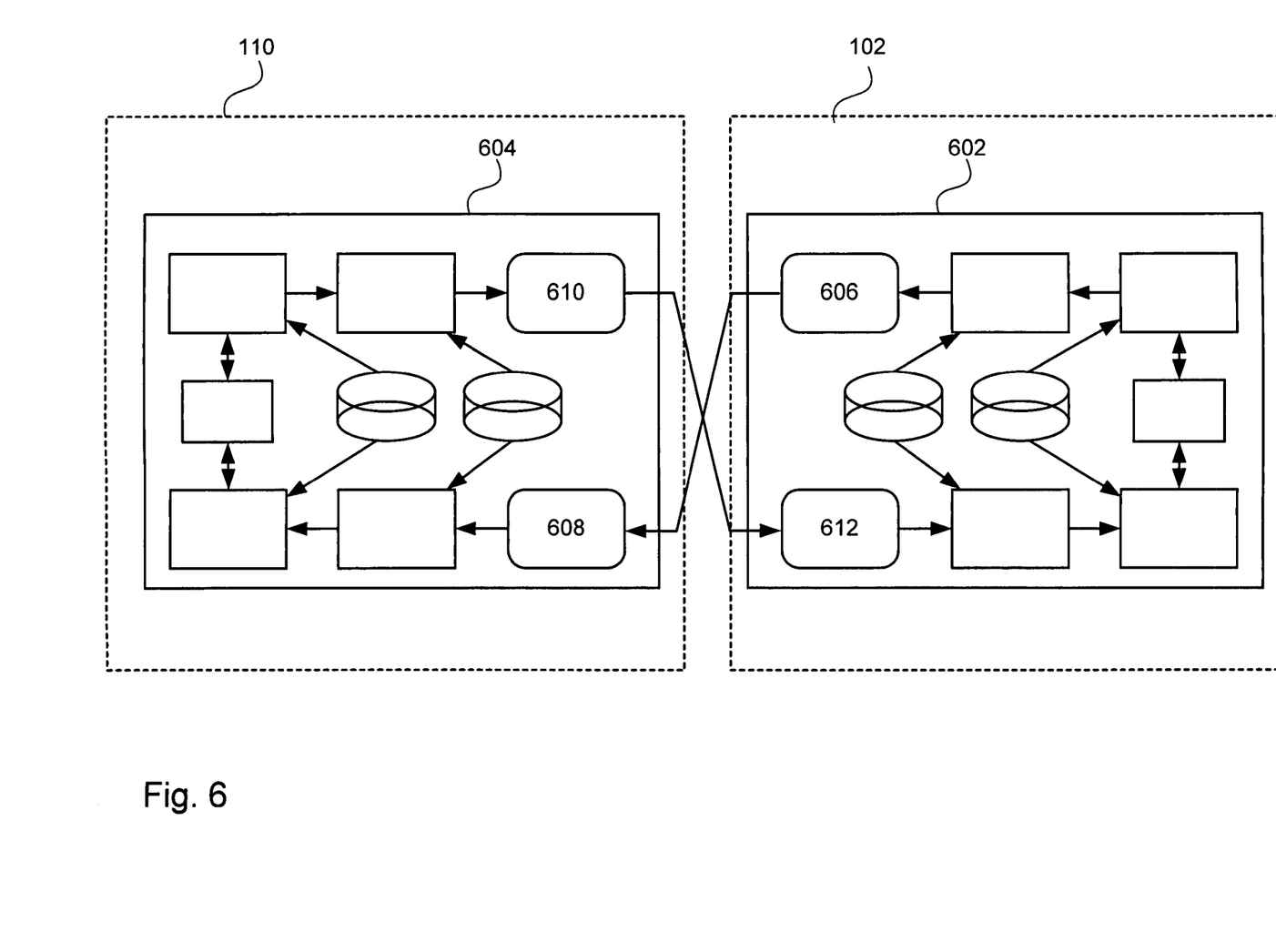
FIG. 6 illustrates a situation where the partner system is a J2EE based enterprise computer system.

FIG. 6 shows a situation where a first B2B messenger 602 (such as e-business 102) is in direct communication with a second B2B messenger 604 (such as, for example, e-market 110), such as one belonging to a partner system that was also built using J2EE, in accordance with an embodiment of the invention. When the first B2B messenger 602 is sending a message to the second B2B messenger 604, a sending EJB partner adapter 606 is directly coupled to a receiving servlet partner adapter 608. The second B2B messenger 604 sends the response by coupling a sending EJB partner adapter 610 directly to a receiving servlet partner adapter 612.

Figure 7A:
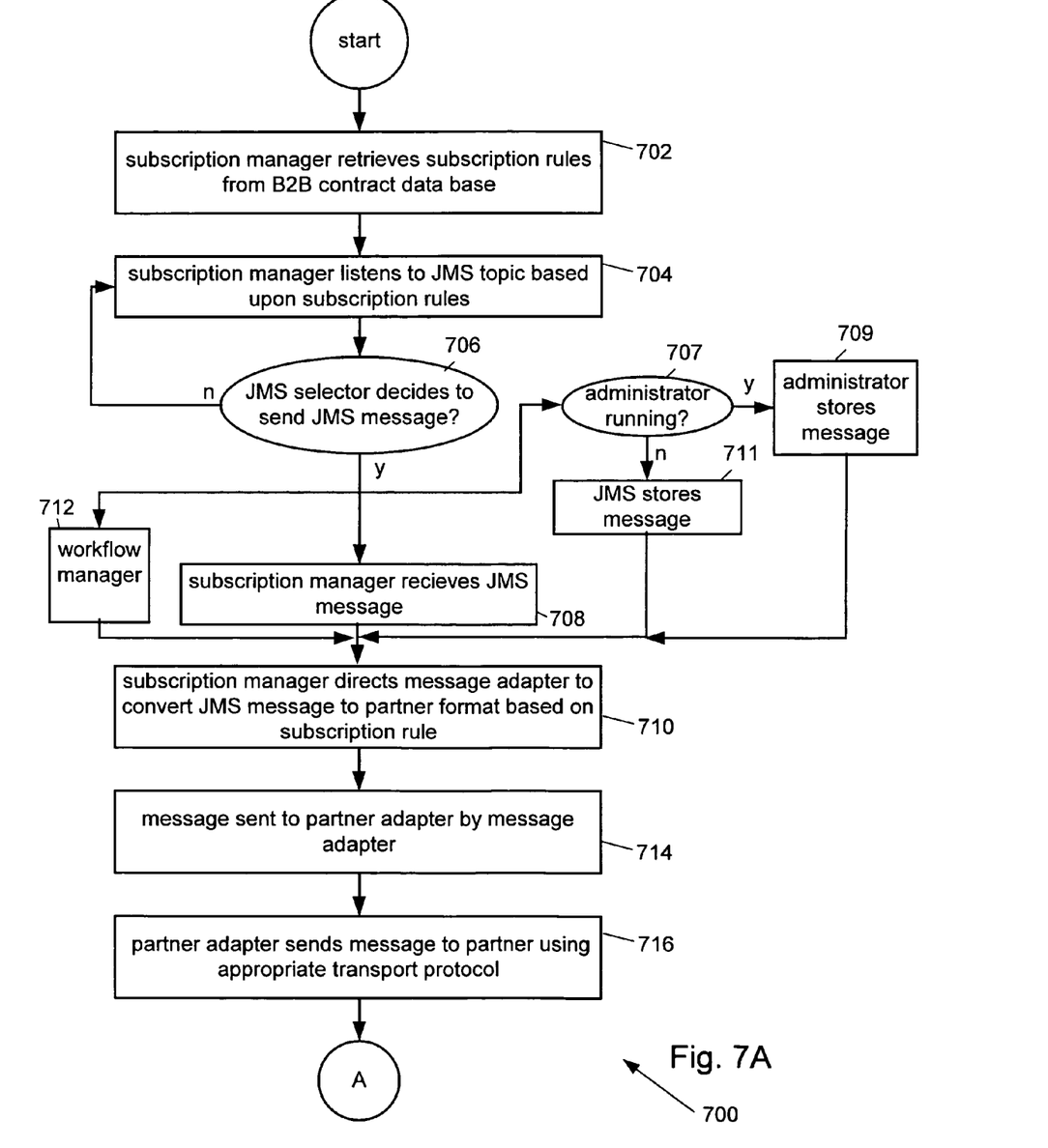
FIG. 7A illustrates a flowchart that details a process for a sending a message to an associated partner by a B2B messenger in accordance with an embodiment of the invention.

FIG. 7A illustrates a flowchart that details a process 700 for a sending a message to an associated partner by a B2B messenger in accordance with an embodiment of the invention. In the described embodiment, the process 700 begins at 702 by a subscription manager retrieving a subscription rule from a B2B contract database. Once the subscription rule has been retrieved, the subscription manager listens to a JMS topic based upon the subscription rule at 704. A JMS selector (specified as part of the subscription rule) within the JMS determines whether a JMS message should be sent to a particular subscriber associated with the subscription manager at 706. When the JMS selector determines that the JMS message should be sent, a determination is made at 707 whether or not an administrator is running. If the administrator is not running, then at 709, the JMS message is stored at the JMS, otherwise, at 711, the JMS message is stored by the administrator. Concurrently, the subscription manager is then sent the JMS message by the JMS topic to which it subscribes based upon the subscription rule at 708. At 710, the subscription manager directs a message adapter to convert the JMS message to a format consistent with the receiving partner based upon the subscription rule. Concurrently with 710, a workflow manager reviews the JMS document at 712. At 714, the formatted message is sent to a partner adapter by the message adapter at 714. At 716, the partner adapter sends the message to the partner using a partner appropriate transport protocol.

Figure 7B:
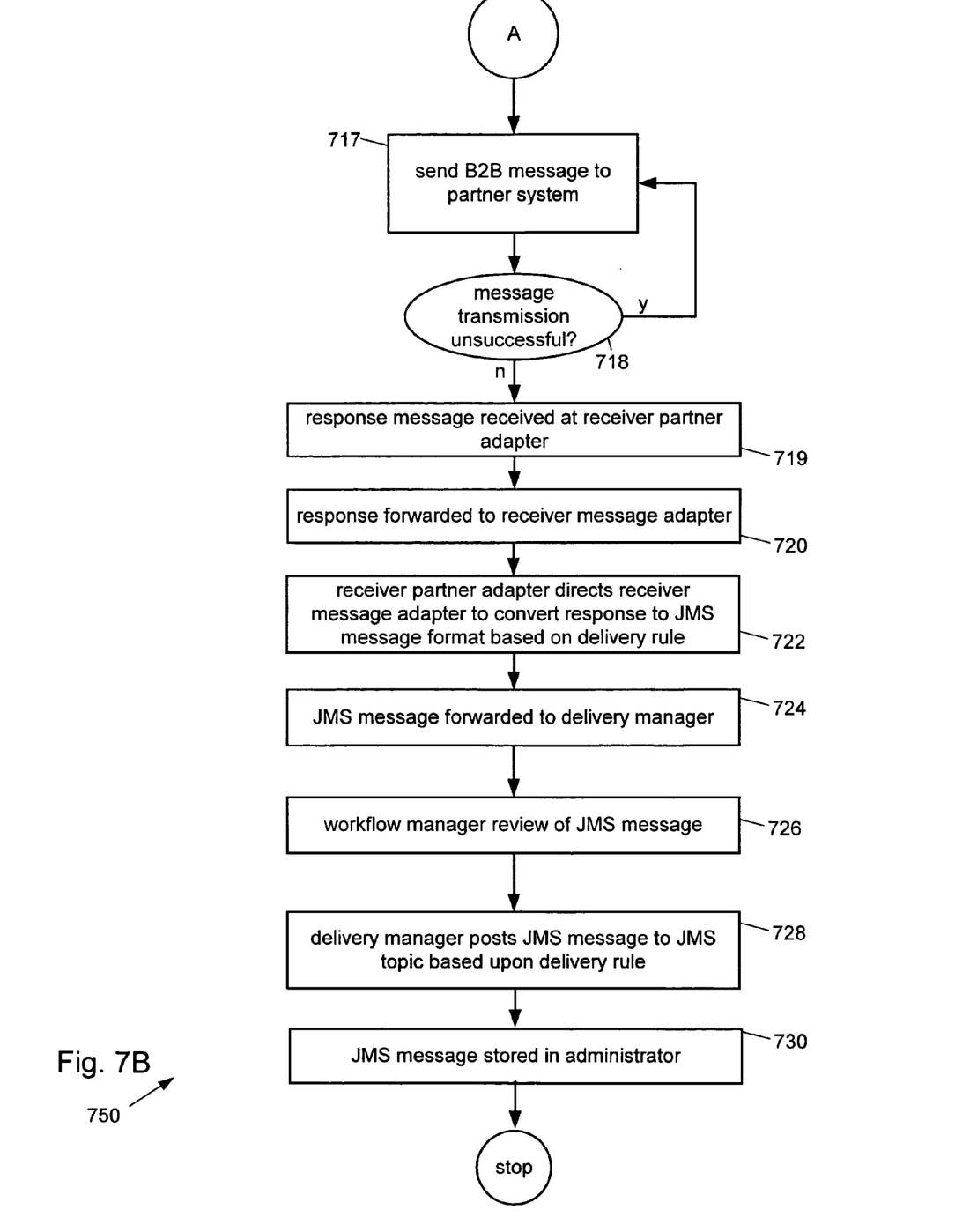
FIG. 7B illustrates a flowchart that details a process for receiving a response message and assuring an asynchronous communication in accordance with an embodiment of the invention.

FIG. 7B illustrates a flowchart that details a process 750 for receiving a response message and assuring an asynchronous communication in accordance with an embodiment of the invention. The process 750 begins at 717 by the sender partner sending a B2B message to the partner system. If message transmission is determined to be unsuccessful at 718, then the sender partner adapter sends the message again at 717. In order to assure reliable communications in an asynchronous environment, the operations 717 and 718 are continued until such time as the determination at 718 is affirmative. Some time after a successful message transmission, a response message is received by the receiver partner adapter at 719 and is, in turn, forwarded to the receiver message adapter at 720. At 722, the receiver partner adapter directs the receiver message adapter to convert the response message to appropriate JMS message format, such as Java from XML, based upon a delivery rule. At this step the response message has been formatted into a form suitable for the local system. Once the JMS message has been appropriately reformatted, the JMS message is sent to a delivery manager at 724 and at 726 the workflow manager reviews the JMS message for completeness and any missing information is filled in by the workflow manager. At 728, the delivery manager posts the JMS message to an appropriate JMS topic as well as to the administrator at 730.

Figure 8:
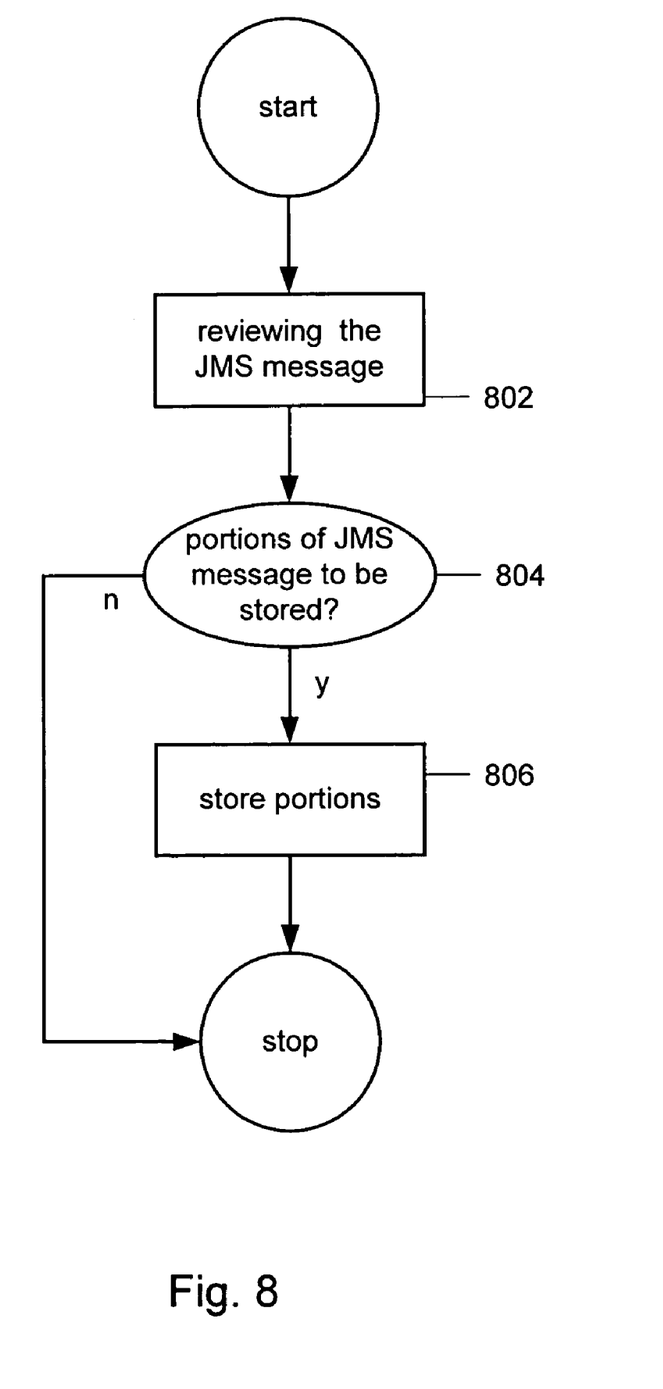
FIG. 8 illustrates a flowchart that details a process for a workflow manager reviewing a JMS message in accordance with an embodiment of the invention.

FIG. 8 illustrates a flowchart that details a process 800 for a workflow manager reviewing a JMS message in accordance with an embodiment of the invention. It should be noted that the process 800 is one implementation of the operation 712 of the process 700 detailed in FIG. 7A and should therefore not be considered to limit the scope or the intent of the invention. The process 800 begins at 802 by the workflow manager reviewing the JMS message and making a determination at 804, based upon the appropriate subscription rule, if there is a portion, or portions, of the JMS message to be stored. If it is determined that there is not a portion, or portions, to be stored, then processing stops, otherwise, that portion, or portions, are stored at 806.

Figure 9:
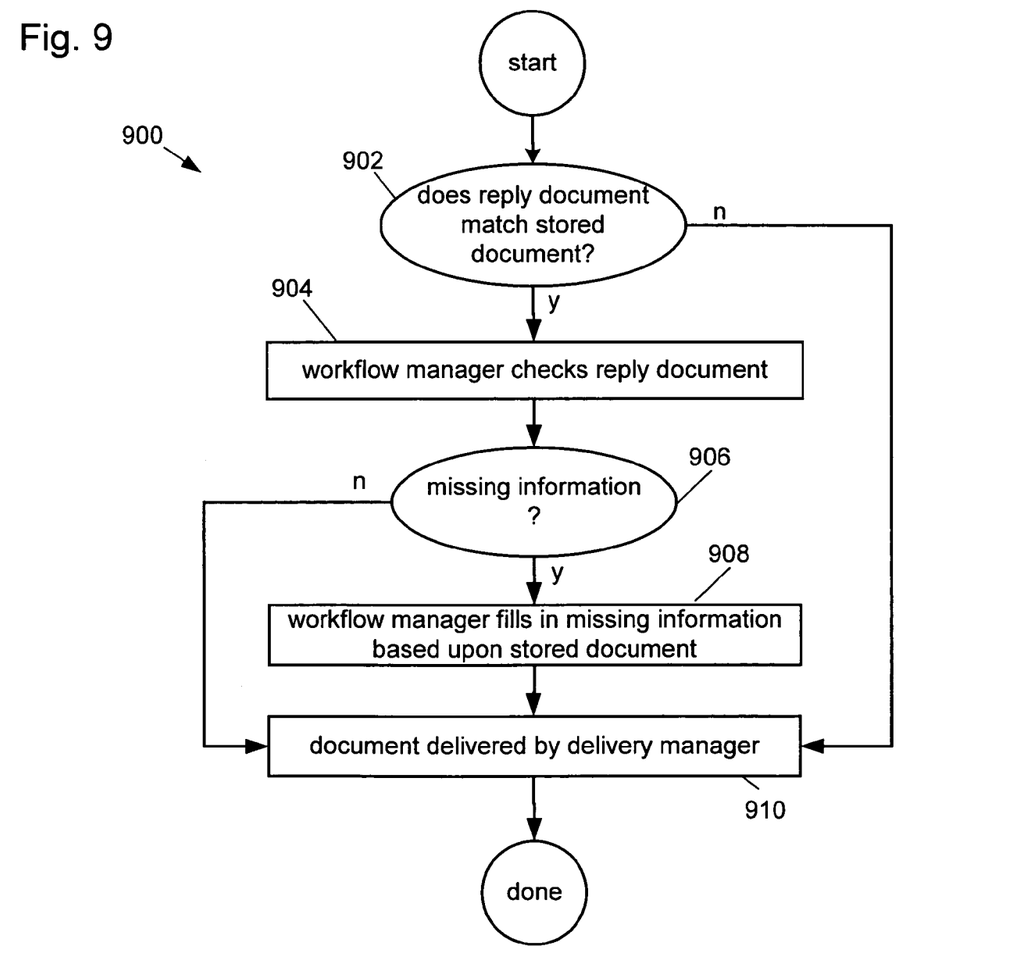
FIG. 9 illustrates a flowchart that details a process for a workflow manager reviewing a response message in accordance with an embodiment of the invention.

FIG. 9 illustrates a flowchart that details a process 900 for a workflow manager reviewing a response message in accordance with an embodiment of the invention. It should be noted that the process 900 is one implementation of the operation 726 of the process 750 detailed in FIG. 7B and should therefore not be considered to limit the scope or the intent of the invention. The process 900 begins at 902 by the workflow manager making a determination whether or not the response matches a stored document based upon the process 800 detailed in the flowchart of FIG. 8. If it is determined that the response does match a stored document, the workflow manager checks the response at 904. Next, at 906, a determination is made whether or not any information is missing from the response. If it is determined that the response is missing information, then the workflow manager fills in the missing information based upon the stored information at 908 after which, the JMS message is delivered by the delivery manager at 910.

Returning to 902, if the response does not match a stored document, then the JMS message is delivered by the delivery manager at 910. Returning to 906, if it is determined that no information is missing, then the JMS message is delivered by the delivery manager at 910.

Figure 10:
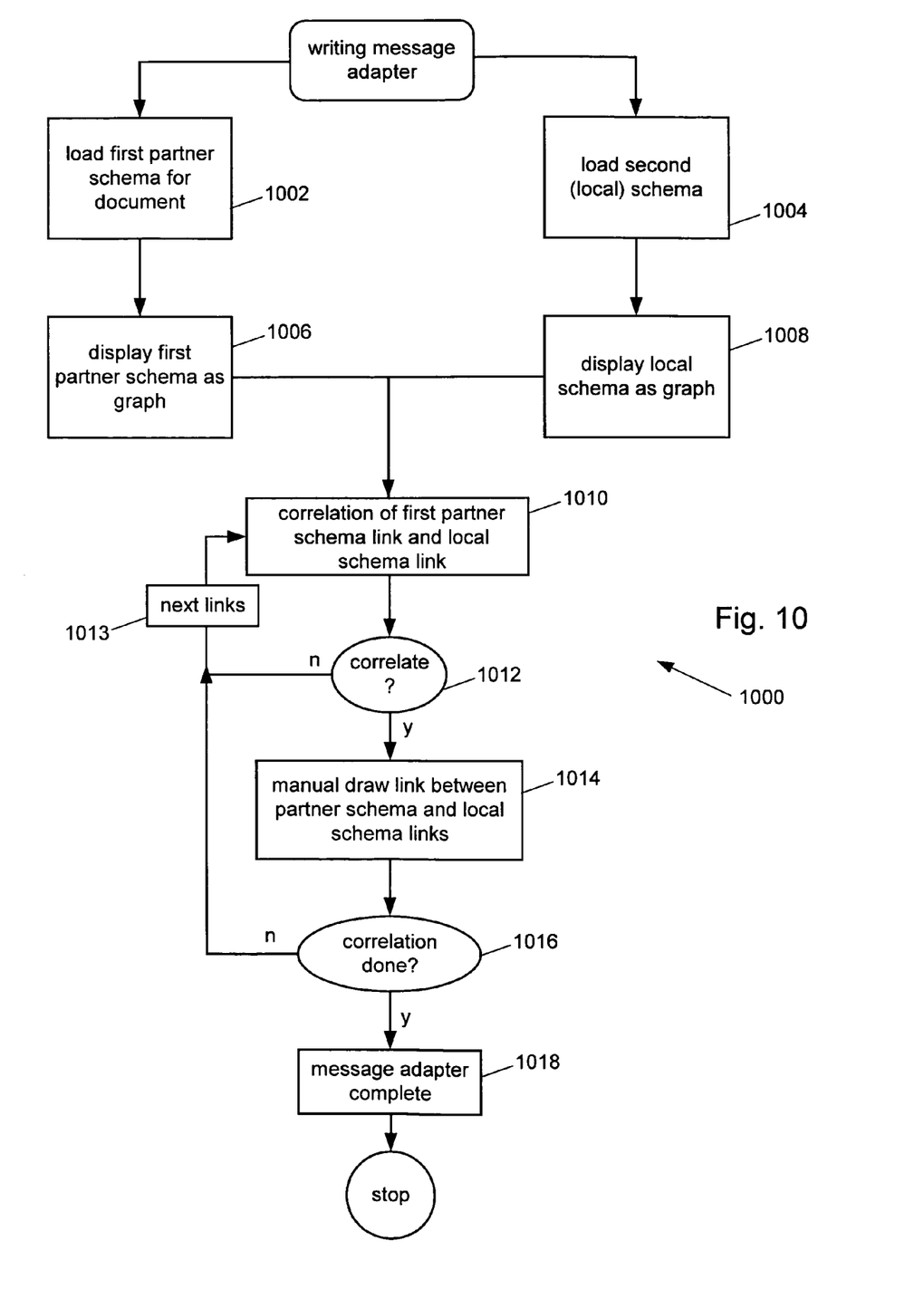
FIG. 10 illustrates a flowchart detailing a process for writing a message adapter in accordance with an embodiment of the invention.

FIG. 10 illustrates a flowchart detailing a process 1000 for writing a message adapter in accordance with an embodiment of the invention. The process 1000 begins at 1002 by loading a first partner schema for a particular document concurrently with loading a second schema for the document at 1004 that represents the local representation of the message. At 1006, the first partner schema is displayed as a graph concurrently with displaying the local schema as a graph at 1008. At 1010, the first partner schema graph and the local schema graph are correlated at a corresponding link. Next, at 1012, a determination is made whether or not there is a correlation between the local link and the first partner link. Such correlation is made by applying a heuristic to recognize structural and naming patterns between the two representations. Nodes in the two graphs that are considered to match are visually linked by drawing an arc between the two nodes in the two graphs. If there is no correlation, then control is passed back to 1013 for a next link; otherwise, a toolkit user manually draws a link between the partner schema and the local schema based upon the hit at 1014. At 1016, a determination is made whether or not the correlation is complete. If it is determined that the correlation is complete, then processing stops else control is passed back to 1013 for a next link.

Figure 11:
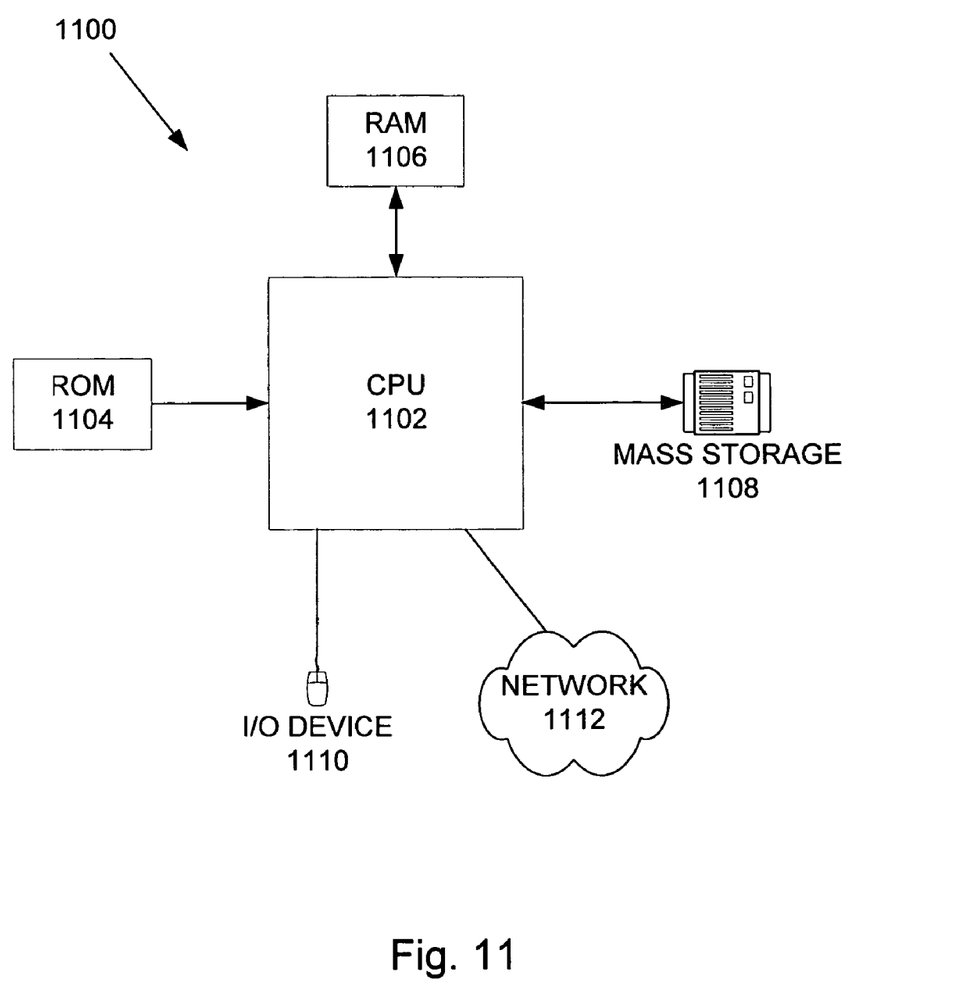
FIG. 11 illustrates a computer system that can be employed to implement the present invention.

FIG. 11 illustrates a computer system 1100 that can be employed to implement the present invention. The computer system 1100 or, more specifically, CPUs 1102, may be arranged to support a virtual machine, as will be appreciated by those skilled in the art. As is well known in the art, ROM acts to transfer data and instructions uni-directionally to the CPUs 1102, while RAM is used typically to transfer data and instructions in a bi-directional manner. CPUs 1102 may generally include any number of processors. Both primary storage devices 1104, 1106 may include any suitable computer-readable media. A secondary storage medium 1108, which is typically a mass memory device, is also coupled bi-directionally to CPUs 1102 and provides additional data storage capacity. The mass memory device 1108 is a computer-readable medium that may be used to store programs including computer code, data, and the like. Typically, mass memory device 1108 is a storage medium such as a hard disk or a tape which generally slower than primary storage devices 1104, 1106. Mass memory storage device 1108 may take the form of a magnetic or paper tape reader or some other well-known device. It will be appreciated that the information retained within the mass memory device 1108, may, in appropriate cases, be incorporated in standard fashion as part of RAM 1106 as virtual memory. A specific primary storage device 1104 such as a CD-ROM may also pass data uni-directionally to the CPUs 1102.

CPUs 1102 are also coupled to one or more input/output devices 1110 that may include, but are not limited to, devices such as video monitors, track balls, mice, keyboards, microphones, touch-sensitive displays, transducer card readers, magnetic or paper tape readers, tablets, styluses, voice or handwriting recognizers, or other well-known input devices such as, of course, other computers. Finally, CPUs 1102 optionally may be coupled to a computer or telecommunications network, e.g., an Internet network, or an intranet network, using a network connection as shown generally at 1112. With such a network connection, it is contemplated that the CPUs 1102 might receive information from the network, or might output information to the network in the course of performing the above-described method steps. Such information, which is often represented as a sequence of instructions to be executed using CPUs 1102, may be received from and outputted to the network, for example, in the form of a computer data signal embodied in a carrier wave. The above-described devices and materials will be familiar to those of skill in the computer hardware and software arts.

It should be noted that the present invention employs various computer-implemented operations involving data stored in computer systems. These operations include, but are not limited to, those requiring physical manipulation of physical quantities. Usually, though not necessarily, these quantities take the form of electrical or magnetic signals capable of being stored, transferred, combined, compared, and otherwise manipulated. The operations described herein that form part of the invention are useful machine operations. The manipulations performed are often referred to in terms, such as, producing, identifying, running, determining, comparing, executing, downloading, or detecting. It is sometimes convenient, principally for reasons of common usage, to refer to these electrical or magnetic signals as bits, values, elements, variables, characters, data, or the like. It should remembered however, that all of these and similar terms are to be associated with the appropriate physical quantities and are merely convenient labels applied to these quantities.

The present invention also relates to a device, system or apparatus for performing the aforementioned operations. The system may be specially constructed for the required purposes, or it may be a general-purpose computer selectively activated or configured by a computer program stored in the computer. The processes presented above are not inherently related to any particular computer or other computing apparatus. In particular, various general-purpose computers may be used with programs written in accordance with the teachings herein, or, alternatively, it may be more convenient to construct a more specialized computer system to perform the required operations.

Although only a few embodiments of the present invention have been described, it should be understood that the present invention may be embodied in many other specific forms without departing from the spirit or the scope of the present invention.

Although the methods of providing reliable B2B communications in accordance with the present invention are particularly suitable for implementation with respect to a Java™ based environment; the methods may generally be applied in any suitable object-based environment. In particular, the methods are suitable for use in platform-independent object-based environments. It should be appreciated that the methods may also be implemented in some distributed object-oriented systems.

It should also be appreciated that the present invention may generally be implemented on any suitable object-oriented computer system. Therefore, the present examples are to be considered as illustrative and not restrictive, and the invention is not to be limited to the details given herein, but may be modified within the scope of the appended claims along with their full scope of equivalents.

What is claimed is:

1. A method of memorializing an e-business audit trail that describes a transaction history of electronic messages between an enterprise computer system in an e-business entity and one or more partners, wherein the enterprise computer system includes a message service operable to perform asynchronous message transactions between the enterprise computer system and the one or more partners, the method comprising:

determining if a message is to be sent to a subscriber by the message service;

if the message is to be sent, determining if an administrator coupled to the message service is running, wherein the administrator is operable to maintain records of the message transactions involving the message service, the records being organized by topics in the administrator;

if the administrator is running, storing a copy of the message in a corresponding topic in the administrator;

if the administrator is not running, storing a copy of the message by the message service;

if the administrator is running, storing a copy of a response to the sent message in the topic in the administrator corresponding to the sent message;

if the administrator is not running, storing a copy of the response by the message service; and creating the e-business audit trail by retrieving the stored copy of the sent message and the stored copy of the corresponding response from the locations where the copies of the sent message and the response were stored.

2. A method as recited in claim 1, wherein the enterprise computer system includes a subscribing portion coupling a first partner and a second partner.

3. A method as recited in claim 2, wherein the subscribing portion comprises:

a subscription manager arranged to receive a message from the first partner;

a subscription message adapter coupled to the subscription manager arranged to convert the first partner message from a first partner message format to a second partner message format; and a partner adapter coupled to the subscription manager adapter arranged send the appropriately formatted message to the second partner.

4. A method as recited in claim 3, wherein the enterprise computer system includes a receiving portion coupling the second partner and the first partner.

5. A method as recited in claim 4, wherein the receiving portion comprises:
- a delivery message adapter coupled to the partner adapter suitably configured to receive a response from the second partner by way of the partner adapter arranged to convert the response from the second partner message format to the first partner message format; and
- a delivery manger coupled to the delivery message adapter arranged to deliver the response to the first partner.

6. A method as recited in claim 1, wherein:
the e-business entity is operable to set a period of time for which the administrator should maintain the records of the message transactions.

7. A method as recited in claim 1, further comprising:
upon starting the administrator after a period of not running, sending all copies of messages and responses stored by the message service to the administrator.

8. A method as recited in claim 1, further comprising:
displaying one or more messages stored in the administrator on a message monitor coupled to the administrator.

9. A enterprise computer system operable to memorialize an e-business audit trail that describes a transaction history of electronic messages between the enterprise computer system and one or more partners, comprising:
- a message service operable to perform asynchronous message transactions between the enterprise computer system and the one or more partners; and
- an administrator coupled to the message service and operable to maintain records of the message transactions involving the message service the records being organized by topics in the administrator;
- wherein the administrator is operable to store copies of messages sent to a subscriber by the message service and copies of responses to the sent messages in a corresponding topic in the administrator when the administrator is ruing;
- wherein the message service is operable to store copies of messages sent to a subscriber by the message service and copies of responses to the sent messages when the administrator is not running; and
- wherein the enterprise computer system is operable to create the e-business audit trail by retrieving the stored copies of the sent messages and the stored copies of the corresponding responses from the locations where the copies of the sent messages and the responses were stored.

10. A system as recited in claim 9, further comprising:
a subscribing portion coupling a first partner and a second partner.

11. A system as recited in claim 10, wherein the subscribing portion comprises:
- a subscription manager aged to receive a message from the first partner;
- a subscription message adapter coupled to the subscription manager arranged to convert the first partner message from a first partner message format to a second partner message format; and
- a partner adapter coupled to the subscription manager adapter arranged send the appropriately formatted message to the second partner.

12. A system as recited in claim 10, further comprising:
a receiving portion coupling the second partner and the first partner.

13. A system as recited in claim 12, wherein the receiving portion includes:
- a delivery message adapter coupled to the partner adapter suitably configured to receive a response from the second partner by way of the partner adapter arranged to convert the response from the second partner message format to the first partner message format; and
- a delivery manager coupled to the delivery message adapter arranged to deliver the response to the first partner.

14. A system as recited in claim 9, wherein:
the administrator is configurable to maintain the records of the message transactions for a certain time period.

15. A system as recited in claim 9, wherein the message service is operable to:
detect when the administrator is started after not running; and
send all copies of messages and responses stored by the message service to the administrator.

16. A system as recited in claim 9, further comprising:
a message monitor coupled to the administrator, wherein the message monitor is operable to display one or more messages stored in the administrator.

17. A computer program product, stored on a machine-readable medium, for memorializing an e-business audit trail that describes a transaction history of electronic messages between an enterprise computer system in an e-business entity and one or more partner comprising instructions operable to cause a computer to:
- determine whether a message is to be sent to a subscriber by a message service operable to perform asynchronous message transactions between the enterprise computer system and the one or more partners;
- if the message is to be sent, determine whether an administrator coupled to the message service is running, wherein the administrator is operable to maintain records of the message transactions involving the message service, the records being organized by topics in the administrator;
- store a copy of the message in a corresponding topic in the administrator when the administrator is running;
- store a copy of the message by the message service when the administrator is not running;
- store a copy of a response to the sent message in the topic in the administrator corresponding to the sent message when the administrator is running;
- store a copy of the response by the message service when the administrator is not running; and
- create the e-business audit trail by retrieving the stored copy of the sent message and the stored copy of the corresponding response from the locations where the copies of the sent message and the response were stored.

* * * * *